(12) United States Patent
 Chen

(10) Patent No.: US 9,743,070 B2
(45) Date of Patent: Aug. 22, 2017

(54) THREE-DIMENSIONAL IMAGE DISPLAY APPARATUS AND THREE-DIMENSIONAL IMAGE DISPLAY

(71) Applicant: Shenzhen China Star Optoelectronics Technology Co., Ltd., Guangdong (CN)

(72) Inventor: Jianhong Chen, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 314 days.

(21) Appl. No.: 14/403,256

(22) PCT Filed: Sep. 1, 2014

(86) PCT No.: PCT/CN2014/085680
§ 371 (c)(1),
(2) Date: Nov. 24, 2014

(87) PCT Pub. No.: WO2016/029488
PCT Pub. Date: Mar. 3, 2016

(65) Prior Publication Data
US 2016/0255337 A1    Sep. 1, 2016

(30) Foreign Application Priority Data
Aug. 27, 2014    (CN) .......................... 2014 1 0429142

(51) Int. Cl.
*H04N 13/00*    (2006.01)
*H04N 13/04*    (2006.01)
*G02B 27/22*    (2006.01)

(52) U.S. Cl.
CPC ......... *H04N 13/0406* (2013.01); *G02B 27/22* (2013.01); *G02B 27/2214* (2013.01); *H04N 13/0418* (2013.01)

(58) Field of Classification Search
CPC ... G02F 1/1335; G02B 27/22; G02B 27/2214; G02B 27/2264; G09G 3/00; G09G 3/003; G09G 3/20; H04N 13/04; H04N 13/0404; H04N 13/0418; H04N 13/0409; H04N 13/0497; H04N 13/0422; H04N 13/0447; H04N 13/045
See application file for complete search history.

(56) References Cited

U.S. PATENT DOCUMENTS 5,949,526 A * 9/1999 Koguchi ............ H04N 1/40031
  355/41
9,116,357 B2 * 8/2015 Chen .................. G02B 27/2214
(Continued)

FOREIGN PATENT DOCUMENTS

CN    103176277    6/2013

*Primary Examiner* — Frank Huang

(57) ABSTRACT

A three-dimensional image display apparatus is provided. The three-dimensional image display apparatus includes an element image array, a backlight source, and a fly-eye lens array. The element image array is disposed between the backlight source and the fly-eye lens array. Incident angles of lights emitted from different directional light sources with respect to the element image array are different. The image resolution of the three-dimensional image display apparatus is raised by using the backlight source having the multiple directional light sources.

17 Claims, 2 Drawing Sheets

(56) References Cited

U.S. PATENT DOCUMENTS

| | | | |
|---|---|---|---|
| 2005/0068590 A1* | 3/2005 | Shiota | B41J 2/45 |
| | | | 358/474 |
| 2010/0188584 A1* | 7/2010 | Liu | G06T 7/0051 |
| | | | 348/699 |
| 2011/0149125 A1* | 6/2011 | Morimoto | H04N 5/225 |
| | | | 348/272 |
| 2012/0002124 A1 | 1/2012 | Huang et al. | |
| 2012/0050562 A1* | 3/2012 | Perwass | H04N 5/2254 |
| | | | 348/222.1 |
| 2014/0055575 A1* | 2/2014 | Imamura | H04N 9/07 |
| | | | 348/49 |

* cited by examiner

THREE-DIMENSIONAL IMAGE DISPLAY APPARATUS AND THREE-DIMENSIONAL IMAGE DISPLAY

RELATED APPLICATIONS

This application is a National Phase of PCT Patent Application No. PCT/CN2014/085680 having International filing date of Sep. 1, 2014, which claims the benefit of priority of Chinese Patent Application No. 201410429142.X filed on Aug. 27, 2014. The contents of the above applications are all incorporated by reference as if fully set forth herein in their entirety.

FIELD OF THE INVENTION

The present invention relates to a display field, and in particular to a three-dimensional image display apparatus and a three-dimensional image display.

BACKGROUND OF THE INVENTION

With the development of technology, a three-dimensional image display apparatus for effectively and realistically displaying images is required in a variety of fields, such as entertainment, gaming, advertising, health care, education, military, etc. Therefore, the developers of the display apparatus have proposed various technologies for displaying three-dimensional images, and various three-dimensional image display apparatuses have been commercialized.

FIG. 1 is a schematic structural view of a conventional three-dimensional image display apparatus, which displays a three-dimensional image through a fly-eye lens array including a plurality of micro lenses. The reference sign 11 refers to a backlight source, the reference sign 12 refers to an element image array constructed of LCD panels, and the reference sign 13 refers to a fly-eye lens array.

The element image array 12 is used to capture three-dimensional scene information, such as the number "3" and the letter "D" in the figure, through the fly-eye lens array 13 in the three-dimensional image display apparatus. Afterward, the three-dimensional scene information in the element image array 12 can be reconstructed through the backlight source 11 and the fly-eye lens array 13. The users can view three-dimensional images with naked eyes. The direction A in FIG. 1 is the display direction.

The three-dimensional image display method provides continuous viewing angles, and the structure of the three-dimensional image display apparatus is simple. However, the image resolution of the three-dimensional image display apparatus depends on the micro lens size on the fly-eye lens array 13. The smaller the micro lens size is, the higher the image resolution of the three-dimensional image display apparatus is. Due to the high production costs of the small micro lenses, the image resolution of the three-dimensional image display apparatus of is generally low.

Therefore, it is necessary to provide a three-dimensional image display apparatus and a three-dimensional image display to resolve the problem of the prior art.

SUMMARY OF THE INVENTION

A primary object of the present invention is to provide a three-dimensional image display apparatus and a three-dimensional image display with high image resolution to resolve the technical problem of the low image resolution of the conventional three-dimensional image display apparatus and three-dimensional image display.

To solve the above problem, the present invention provides the technical solution as follows:

An embodiment of the present invention provides a three-dimensional image display apparatus, comprising an element image array including a plurality of pixel cells for displaying three-dimensional scene information;
a backlight source including a plurality of directional light sources for providing the element image array with display light sources; and
a fly-eye lens array including a plurality of micro lenses for processing the three-dimensional scene information to reconstruct a three-dimensional scene in a display area;
wherein the element image array is disposed between the backlight source and the fly-eye lens array, incident angles of lights emitted from the different directional light sources with respect to the element image array are different,
a difference of the incident angles between the lights emitted from two adjacent directional light sources with respect to the element image array is less than a pre-determined value, and each of the pixel cells of the element image array corresponds to one of the micro lenses of the fly-eye lens array.

In the three-dimensional image display apparatus of the present invention, the backlight source comprises:
a scattering light source array including a plurality of scattering light sources; and
a collimating lens for transforming scattered lights from the scattering light sources into collimated lights, wherein the collimating lens is disposed between the scattering light source array and the element image array, and a plurality of scattering light sources included in the scattering light source array are arranged as an equally spaced array.

In an embodiment of the present invention, the three-dimensional image display apparatus comprises:
an element image array including a plurality of pixel cells for displaying three-dimensional scene information;
a backlight source including a plurality of directional light sources for providing the element image array with display light sources; and
a fly-eye lens array including a plurality of micro lenses for processing the three-dimensional scene information to reconstruct a three-dimensional scene in a display area;
wherein the element image array is disposed between the backlight source and the fly-eye lens array, and incident angles of lights emitted from the different directional light sources with respect to the element image array are different.

In the three-dimensional image display apparatus of the present invention, a difference of the incident angles between the lights emitted from two adjacent directional light sources with respect to the element image array is less than a pre-determined value.

In the three-dimensional image display apparatus of the present invention, the backlight source comprises:
a scattering light source array including a plurality of scattering light sources; and
a collimating lens for transforming scattered lights from the scattering light sources into collimated lights, wherein the collimating lens is disposed between the scattering light source array and the element image array.

In the three-dimensional image display apparatus of the present invention, a plurality of scattering light sources included in the scattering light source array are arranged as an equally spaced array.

In the three-dimensional image display apparatus of the present invention, the scattering light source array is a 3×3 array or a 4×4 array.

In the three-dimensional image display apparatus of the present invention, the scattering light source array is disposed on a focal plane of the collimating lens.

In the three-dimensional image display apparatus of the present invention, each of the pixel cells of the element image array corresponds to one of the micro lenses of the fly-eye lens array.

In the three-dimensional image display apparatus of the present invention, image resolution of the three-dimensional image display apparatus is adjusted by controlling display information of the pixel cells of the element image array and a switch of each of the directional light sources.

In the three-dimensional image display apparatus of the present invention, the different directional light sources correspond to the different display information of the pixel cells of the element image array.

An embodiment of the present invention also provides a three-dimensional image display, comprising:
an element image array driving circuit for driving an element image array;
a backlight source driving circuit for driving a backlight source; and
a three-dimensional image display apparatus, comprising:
the element image array including a plurality of pixel cells for displaying three-dimensional scene information;
the backlight source including a plurality of directional light sources for providing the element image array with display light sources; and
a fly-eye lens array including a plurality of micro lenses for processing the three-dimensional scene information to reconstruct a three-dimensional scene in a display area;
wherein the element image array is disposed between the backlight source and the fly-eye lens array, and incident angles of lights emitted from the different directional light sources with respect to the element image array are different.

In the three-dimensional image display apparatus of the present invention, a difference of the incident angles between the lights emitted from two adjacent directional light sources with respect to the element image array is less than a pre-determined value.

In the three-dimensional image display apparatus of the present invention, the backlight source comprises:
a scattering light source array including a plurality of scattering light sources; and
a collimating lens for transforming scattered lights from the scattering light sources into collimated lights, wherein the collimating lens is disposed between the scattering light source array and the element image array.

In the three-dimensional image display apparatus of the present invention, a plurality of scattering light sources included in the scattering light source array are arranged as an equally spaced array.

In the three-dimensional image display apparatus of the present invention, the scattering light source array is a 3×3 array or a 4×4 array.

In the three-dimensional image display apparatus of the present invention, the scattering light source array is disposed on a focal plane of the collimating lens.

In the three-dimensional image display apparatus of the present invention, each of the pixel cells of the element image array corresponds to one of the micro lenses of the fly-eye lens array.

In the three-dimensional image display apparatus of the present invention, image resolution of the three-dimensional image display apparatus is adjusted by controlling display information of the pixel cells of the element image array and a switch of each of the directional light sources.

In the three-dimensional image display apparatus of the present invention, the different directional light sources correspond to the different display information of the pixel cells of the element image array.

Compared to the conventional three-dimensional image display apparatus and three-dimensional image display, the three-dimensional image display apparatus or the three-dimensional image display of the present invention utilizes a back light source having a plurality of directional light sources, and therefore the image resolution of the three-dimensional image display apparatus is raised, and the technical problem of the low image resolution of the conventional three-dimensional image display apparatus and three-dimensional image display is solved.

To make the foregoing contents of the present invention more clearly understood, the preferred embodiments are described in detail below in conjunction with accompanying drawings.

DETAILED DESCRIPTION OF THE PREFERRED EMBODIMENTS

Figure 1:
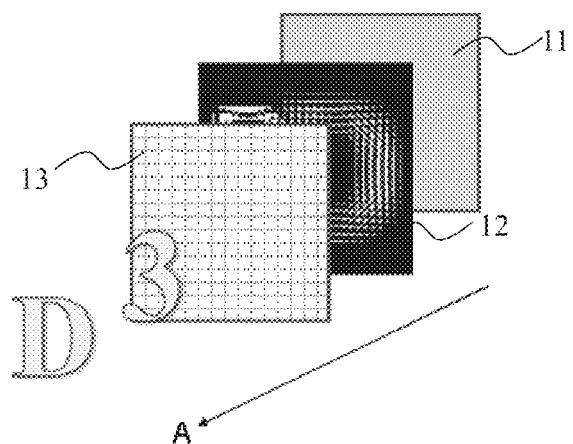
FIG. 1 is a structural schematic diagram of a conventional three-dimensional image display apparatus.

The following description of the embodiments with reference to the accompanying drawings is used to illustrate particular embodiments of the present invention. The directional terms referred in the present invention, such as "upper", "lower", "front", "after", "left", "right", "inner", "outer", "side surface", etc. are only directions with regard to the accompanying drawings. Therefore, the directional terms used for describing and illustrating the present invention are not intended to limit the present invention.

In the drawings, units with similar structures are indicated by the same reference number.

Figure 2:
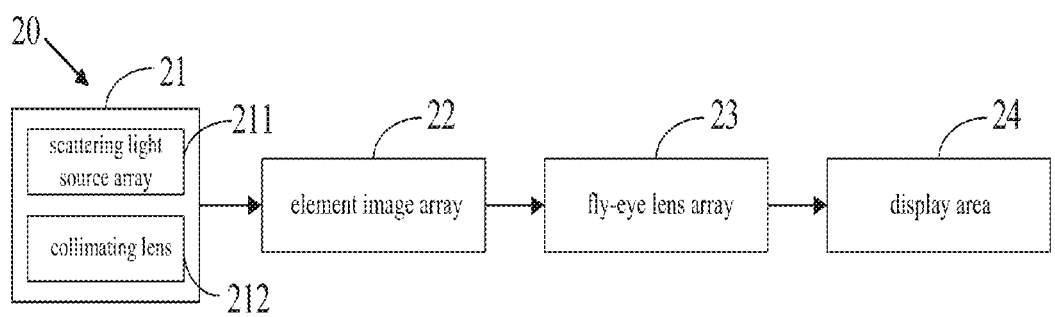
FIG. 2 is a structural block diagram of a three-dimensional image display apparatus in accordance with a preferred embodiment of the present invention.

Please refer to FIG. 2, which is a structural block diagram of a three-dimensional image display apparatus in accordance with a preferred embodiment of the present invention. The three-dimensional image display apparatus 20 of the preferred embodiment includes an element image array 22, a backlight source 21, and a fly-eye lens array 23. The element image array 22 is constructed of a liquid crystal display panel, which includes a plurality of pixel cells for displaying three-dimensional scene information. The backlight source 21 includes a plurality of directional light sources for providing the element image array with display light sources. The fly-eye lens array 23 includes a plurality of micro lenses for processing the three-dimensional scene information to reconstruct a three-dimensional scene in a display area 24.

Figure 3:
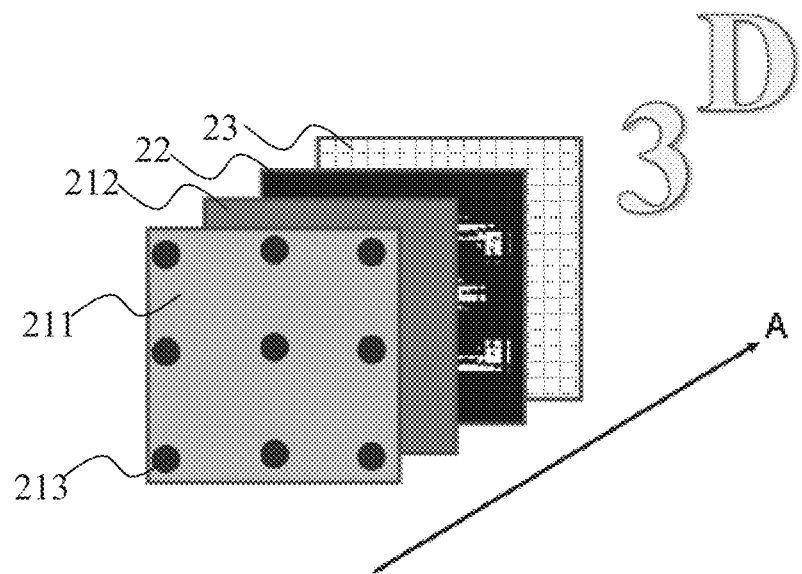
FIG. 3 is a structural schematic diagram of a three-dimensional image display apparatus in accordance with a preferred embodiment of the present invention.

As shown in FIG. 3, which is a structural schematic diagram of a three-dimensional image display apparatus in accordance with a preferred embodiment of the present invention, the backlight source 21 includes a scattering light source array 211 and a collimating lens 212. The scattering light source array 211 comprises a plurality of scattering light sources 213, which are arranged as an equally spaced array. In FIG. 3, the scattering light source array 211 is arranged as a 3×3 array (it can certainly be arranged as a 4×4 array). The collimating lens 212 transforms scattered lights from the scattering light sources 213 into collimated lights for forming a plurality of light sources.

The element image array 22 is disposed between the collimating lens 212 of the backlight source 21 and the fly-eye lens array 23. The collimating lens 212 is disposed between the scattering light source array 211 and the element image array 22. The scattering light source array 211 is disposed on a focal plane of the collimating lens 212. The incident angles of the lights emitted from different directional light sources are different with respect to the element image array 22. The element image array 22 and the fly-eye lens array 23 are arranged in parallel, and therefore the incident angles of the lights emitted from the different directional light sources with respect to the fly-eye lens array 23 are different. The pixel cells of the element image array 22 have one-to-one correspondence to the micro lenses of the fly-eye lens array 23 to ensure that each of the micro lenses is able to reconstruct the image content of the corresponding pixel cell.

The following describes the operating principle of the preferred embodiment of the three-dimensional image display apparatus in detail. Please refer to FIG. 4, which is the schematic diagram of the operating principle of the three-dimensional image display apparatus in accordance with the preferred embodiment of the present invention.

When the three-dimensional image display apparatus of the preferred embodiment is operating, a scattering light source 213 of the scattering light source array 211 of the backlight resource 21 firstly emits a scattered light. Since the scattering light sources 213 are disposed on the focal plane of the collimating lens 212, the scattered lights are transformed into collimated lights through the collimating lens 212.

Subsequently, the collimated lights emitted from the collimating lens 212 are incident on the pixel cells 221 of the element image array 22, so that the collimated lights emitted from the element image array 22 have three-dimensional scene information.

Figure 4:
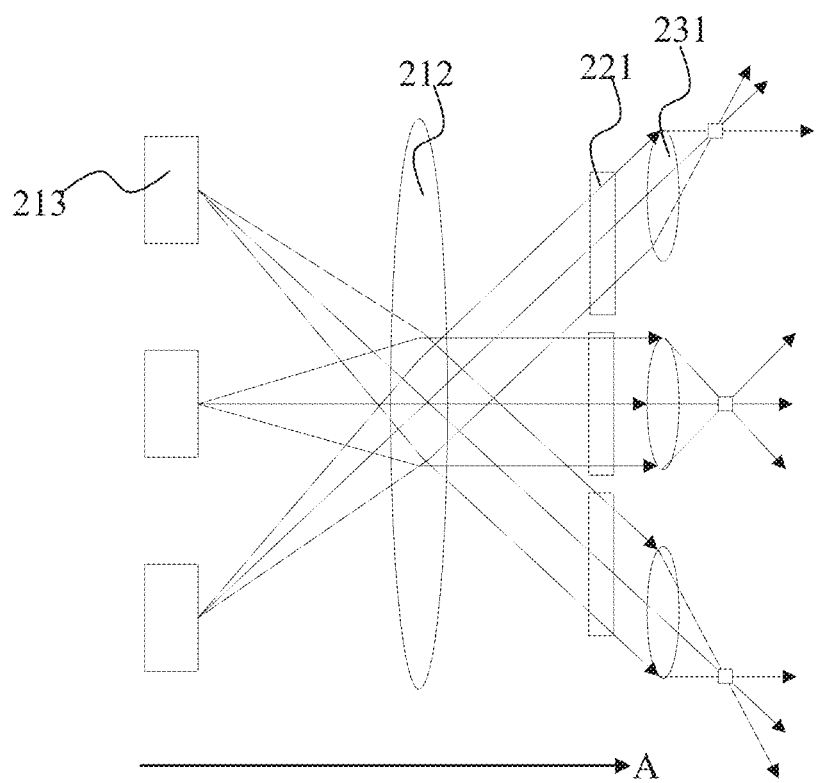
FIG. 4 is a schematic diagram of the operating principle of a three-dimensional image display apparatus in accordance with a preferred embodiment of the present invention.

Afterward, the collimated lights having three-dimensional scene information are incident on the fly-eye lens array 23. The collimated lights having three-dimensional scene information are refracted by the micro lenses 231 of the fly-eye lens array 23, and the three-dimensional scene is reconstructed in the corresponding display area 24. Since the one scattered light from a certain scattering light sources 213 is incident on the fly-eye lens array 23 with a specific incident angle (i.e. the incident angles of the lights emitted from the different directional light sources with respect to the element image array 22 or the fly-eye lens array 23 are different), the scattered lights of the scattering light sources 23 only focus on the display area 24 to reconstruct the three-dimensional scene. As shown in FIG. 4, the scattered lights of the scattering light sources 213 in the lower left focus on the upper right area of the fly-eye micro lenses 231 of the lens array 23. Similarly, the scattered lights of the scattering light sources 213 in the upper left focus on the lower right area of the micro lenses 231 of the fly-eye lens array 23. The scattered lights of the scattering light sources 213 in the middle left focus on the middle right area of the micro lenses 231 of the fly-eye lens array 23.

In this way, the different scattering light sources 213 operate at different timings, and the pixel cells 221 of the element image array 22 display different display information at different timings, so that the different directional light sources (or the different scattering light sources 213) correspond to the different pixel cells 221 of the element image array 22, improving the image resolution. Theoretically, the image resolution of the three-dimensional image display apparatus of the preferred embodiment is N times the image resolution of the conventional three-dimensional image display apparatus. N is the number of the directional light sources included in the backlight source of the three-dimensional image display apparatus.

For instance, at the first timing t1, the scattering light source 213 in the lower left of FIG. 4 operates (the other scattering light sources 213 are off), and the pixel cell 221 of the element image array 22 displays the first display information. At the second timing t2, the scattering light source 213 in the middle left operates (the other scattering light sources 213 are off), and the pixel cell 221 of the element image array 22 displays the second display information. At the third timing t3, the scattering light source 213 in the upper left of FIG. 4 operates (the other scattering light sources 213 are off), and the pixel cell 221 of the element image array 22 displays the third display information. Thus, at the first timing t1, the three-dimensional scene of the first display information is reconstructed in the upper right of the micro lenses 231 of the fly-eye lens array 23. At the second timing t2, the three-dimensional scene of the second display information is reconstructed in the middle right of the micro lenses 231 of the fly-eye lens array 23. At the third timing t3, the three-dimensional scene of the third display information is reconstructed in the lower right of the micro lenses 231 of the fly-eye lens array 23. In the time interval from the first timing t1 to the third timing t3, due to persistence of vision, the original display area 24 of one pixel displays the contents of three pixels, so that the image resolution of the three-dimensional image display apparatus is three times the image resolution of the conventional three-dimensional image display apparatus. Certainly, if N scattering light sources 213 perform three-dimensional scene reconstruction on the different display information at N timings, the image resolution of the three-dimensional image display apparatus is N times the image resolution of the conventional three-dimensional image display apparatus.

In order to ensure the imaging result of the three-dimensional image display apparatus, the scattering light source array 211 is preferably the scattering light sources 213 which are equally spaced in an array, such that the collimated lights emitted from the backlight source 21 with different directions can be separated with substantially equal angles (i.e., the differences of the incident angles between the lights emitted from two adjacent directional light sources with regard to the element image array 22 are substantially equal or less than a defined value). Therefore, a plurality of pixels with an equal size are formed in an area of an original pixel. The pixels formed are arranged in an array according to the scattering light sources in the scattering light source array 211.

Preferably, the three-dimensional image display apparatus of the preferred embodiment can adjust the image resolution of the three-dimensional image display apparatus by controlling the display information of the pixel cells 221 of the element image array 22 and a switch of each of the directional light sources. As the directional light sources of the backlight source 21 are divided into four areas, each area has the same size, and the number of the directional light sources within an area is substantially equal. As the directional light sources in each area correspond to different display information of the pixel cells 221 of the element image array 22, the directional light sources in each area are turned on only when the pixel cells 221 have corresponding display information. The image resolution of the three-dimensional image display apparatus is four times the conventional three-dimensional image display apparatus.

As the directional light sources of the backlight source 21 are divided into eight areas, the image resolution of the three-dimensional image display apparatus is eight times the conventional three-dimensional image display apparatus. The image resolution of the three-dimensional image display apparatus can be adjusted by controlling the display information of the pixel cells 221 of the element image array 22 and a switch of each of the directional light sources. Certainly, raising the image resolution increase also depends on other factors, such as the refresh frequency of the display information of the pixel cells of the element image array and so on.

An embodiment of the present invention further provides a three-dimensional image display. The three-dimensional image display includes an aforementioned three-dimensional image display apparatus, an element image array driving circuit, and a backlight source driving circuit. The element image array driving circuit is used for driving the element image array in the three-dimensional image display apparatus. The backlight source driving circuit is used for driving the backlight source in the three-dimensional image display apparatus.

The operating principle of the three-dimensional image display of the present invention is the same as or similar to the relative description of the preferred embodiment of the above three-dimensional image display apparatus. For the details, please refer to the related description of the above three-dimensional image display apparatus of the preferred embodiment.

The three-dimensional image display apparatus and the three-dimensional image display raise the image resolution of the three-dimensional image display apparatus, and resolve the technical problem of the low resolution of the conventional three-dimensional image display apparatus and three-dimensional image display by using a backlight source having a plurality of directional light sources.

In summary, although the preferred embodiment of the present invention has been disclosed above, the foregoing preferred embodiment of the present invention is not intended to limit the present invention. A person of ordinary skill in the art, without departing from the spirit and the scope of the invention, may make various modifications and variations. Therefore, the scope of the present invention is defined in the claims.

What is claimed is:

1. A three-dimensional image display apparatus, comprising:
   an element image array including a plurality of pixel cells for displaying three-dimensional scene information;
   a backlight source including a plurality of directional light sources for providing the element image array with display light sources;
   wherein the backlight source comprises:
      a scattering light source array including a plurality of scattering light sources; and
      a collimating lens for transforming scattered lights from the scattering light sources into collimated lights,
   wherein the collimating lens is disposed between the scattering light source array and the element image array, and the scattering light sources included in the scattering light source array are arranged as an equally spaced array; and
      a fly-eye lens array including a plurality of micro lenses for processing the three-dimensional scene information to reconstruct a three-dimensional scene in a display area;
   wherein the element image array is disposed between the backlight source and the fly-eye lens array, incident angles of lights emitted from the different directional light sources with respect to the element image array are different,
   a difference of the incident angles between the lights emitted from two adjacent directional light sources with respect to the element image array is less than a pre-determined value, and
   each of the pixel cells of the element image array corresponds to one of the micro lenses of the fly-eye lens array.

2. A three-dimensional image display apparatus, comprising:
   an element image array including a plurality of pixel cells for displaying three-dimensional scene information;
   a backlight source including a plurality of directional light sources for providing the element image array with display light sources
   wherein the backlight source comprises:
      a scattering light source array including a plurality of scattering light sources; and
      a collimating lens for transforming scattered lights from the scattering light sources into collimated lights,
   wherein the collimating lens is disposed between the scattering light source array and the element image array, and the scattering light sources included in the scattering light source array are arranged as an equally spaced array; and
      a fly-eye lens array including a plurality of micro lenses for processing the three-dimensional scene information to reconstruct a three-dimensional scene in a display area;
   wherein the element image array is disposed between the backlight source and the fly-eye lens array, and incident angles of lights emitted from the different directional light sources with respect to the element image array are different.

3. The three-dimensional image display apparatus as claimed in claim 2, wherein a difference of the incident angles between the lights emitted from two adjacent directional light sources with respect to the element image array is less than a pre-determined value.

4. The three-dimensional image display apparatus as claimed in claim 2, wherein a plurality of scattering light sources included in the scattering light source array are arranged as an equally spaced array.

5. The three-dimensional image display apparatus as claimed in claim 4, wherein the scattering light source array is a 3×3 array or a 4×4 array.

6. The three-dimensional image display apparatus as claimed in claim 2, wherein the scattering light source array is disposed on a focal plane of the collimating lens.

7. The three-dimensional image display apparatus as claimed in claim 2, wherein each of the pixel cells of the element image array corresponds to one of the micro lenses of the fly-eye lens array.

8. The three-dimensional image display apparatus as claimed in claim 2, wherein image resolution of the three-dimensional image display apparatus is adjusted by controlling display information of the pixel cells of the element image array and a switch of each of the directional light sources.

9. The three-dimensional image display apparatus as claimed in claim 8, wherein the different directional light sources correspond to the different display information of the pixel cells of the element image array.

10. A three-dimensional image display, comprising:
an element image array driving circuit for driving an element image array;
a backlight source driving circuit for driving a backlight source; and
a three-dimensional image display apparatus, comprising:
the element image array including a plurality of pixel cells for displaying three-dimensional scene information;
the backlight source including a plurality of directional light sources for providing the element image array with display light sources,
wherein the backlight source comprises:
a scattering light source array including a plurality of scattering light sources; and
a collimating lens for transforming scattered lights from the scattering light sources into collimated lights,
wherein the collimating lens is disposed between the scattering light source array and the element image array, and the scattering light sources included in the scattering light source array are arranged as an equally spaced array; and
a fly-eye lens array including a plurality of micro lenses for processing the three-dimensional scene information to reconstruct a three-dimensional scene in a display area;
wherein the element image array is disposed between the backlight source and the fly-eye lens array, and incident angles of lights from the different directional light sources with respect to the element image array are different.

11. The three-dimensional image display apparatus as claimed in claim 10, wherein a difference of the incident angles between the lights emitted from two adjacent directional light sources with respect to the element image array is less than a pre-determined value.

12. The three-dimensional image display apparatus as claimed in claim 10, wherein a plurality of scattering light sources included in the scattering light source array are arranged as an equally spaced array.

13. The three-dimensional image display apparatus as claimed in claim 12, wherein the scattering light source array is a 3×3 array or a 4×4 array.

14. The three-dimensional image display apparatus as claimed in claim 10, wherein the scattering light source array is disposed on a focal plane of the collimating lens.

15. The three-dimensional image display apparatus as claimed in claim 10, wherein each of the pixel cells of the element image array corresponds to one of the micro lenses of the fly-eye lens array.

16. The three-dimensional image display apparatus as claimed in claim 10, wherein image resolution of the three-dimensional image display apparatus is adjusted by controlling display information of the pixel cells of the element image array and a switch of each of the directional light sources.

17. The three-dimensional image display apparatus as claimed in claim 16, wherein the different directional light sources correspond to the different display information of the pixel cells of the element image array.

* * * * *